United States Patent
Tyagi et al.

(10) Patent No.: US 11,569,668 B2
(45) Date of Patent: Jan. 31, 2023

(54) SYSTEM AND METHOD FOR DYNAMIC BALANCING POWER IN A BATTERY PACK

(71) Applicant: IgrenEnergi, Inc., Mountain View, CA (US)

(72) Inventors: Sunit Tyagi, Karnataka (IN); Jitendra Apte, Maharashtra (IN); Hemanshu Bhatt, Maharashtra (IN); Anupam Hudait, West Bengal (IN); Ranjith Nandakumar, Tamil Nadu (IN); Pooja Sharma, Himachal Pradesh (IN); Dipti Kapadia, Maharashtra (IN); Rashmi Naroji, Maharashtra (IN); Bhavin Shah, Maharashtra (IN); Deepthi Keshavan, Karnataka (IN)

(73) Assignee: IGRENENERGI, INC., Mountain View, CA (US)

( * ) Notice: Subject to any disclaimer, the term of this patent is extended or adjusted under 35 U.S.C. 154(b) by 267 days.

(21) Appl. No.: 16/928,889

(22) Filed: Jul. 14, 2020

(65) Prior Publication Data

US 2022/0021221 A1 Jan. 20, 2022

(51) Int. Cl.
*H02J 7/00* (2006.01)
*H02M 1/00* (2006.01)
*H02M 3/158* (2006.01)

(52) U.S. Cl.
CPC ............ *H02J 7/0014* (2013.01); *H02J 7/005* (2020.01); *H02J 7/0048* (2020.01);
(Continued)

(58) Field of Classification Search
CPC ........ H02J 7/0014; H02J 7/0048; H02J 7/005; H02M 1/0043; H02M 1/0045; H02M 1/007
(Continued)

(56) References Cited

U.S. PATENT DOCUMENTS 5,625,545 A * 4/1997 Hammond .............. H02M 7/23
                                                        363/71
5,869,950 A * 2/1999 Hoffman, Jr. ..... H01M 10/4207
                                                       320/132
(Continued)

FOREIGN PATENT DOCUMENTS

CN    106208123 A  * 12/2016
CN    106230068 A  * 12/2016    ............ H02J 7/0014
(Continued)

OTHER PUBLICATIONS

ISA United States Patent and Trademark Office, International Search Report Issued in Application No. PCT/US2021/041290, dated Oct. 20, 2021, WIPO, 10 pages.

*Primary Examiner* — John T Trischler
(74) *Attorney, Agent, or Firm* — Alleman Hall Creasman & Tuttle LLP

(57) ABSTRACT

A system for dynamically balancing power in a battery pack during charging and discharging includes a battery pack, a control unit, and a load unit. The battery pack includes one or more modules. Each module includes one or more bricks. Each brick includes one or more blocks connected either in a series configuration or in a parallel configuration. Each block includes one or more cells. The control unit is connected with the battery pack across each of the blocks for processing power from each of the blocks irrespective of a power mismatch between the blocks. The control unit dynamically balances the power in the battery pack by controlling a differential current from a block with higher state of charge (SOC) to a block of lower SOC, using one or more converters and thereby maximizing available energy of the battery pack during charging and discharging.

17 Claims, 12 Drawing Sheets

(52) U.S. Cl.
CPC ......... *H02M 1/007* (2021.05); *H02M 1/0043* (2021.05); *H02M 1/0045* (2021.05); *H02J 7/0024* (2013.01); *H02J 2207/20* (2020.01); *H02M 1/0074* (2021.05); *H02M 1/0077* (2021.05); *H02M 3/1584* (2013.01)

(58) Field of Classification Search
USPC ........................................................ 320/118
See application file for complete search history.

(56) References Cited

U.S. PATENT DOCUMENTS

| | | | | |
|---|---|---|---|---|
| 5,896,023 A * | 4/1999 | Richter | ...................... | H02J 7/14 324/429 |
| 6,150,795 A * | 11/2000 | Kutkut | .................. | H02J 7/0018 320/118 |
| 6,304,059 B1 * | 10/2001 | Chalasani | ................. | H02J 7/34 320/118 |
| 7,109,685 B2 * | 9/2006 | Tate, Jr. | .............. | H01M 10/486 320/132 |
| 7,151,358 B1 * | 12/2006 | Yang | ...................... | H02J 7/0016 320/160 |
| 7,282,814 B2 * | 10/2007 | Jacobs | .................. | H02J 7/0018 307/82 |
| 7,489,106 B1 * | 2/2009 | Tikhonov | ................ | B60L 58/15 320/120 |
| 7,602,145 B2 * | 10/2009 | Renda | .................. | B60L 58/15 320/118 |
| 8,269,502 B2 * | 9/2012 | Desprez | ............... | G01R 31/392 324/427 |
| 8,482,155 B2 * | 7/2013 | Choi | ...................... | H02J 3/382 307/82 |
| 8,552,587 B2 * | 10/2013 | Tyagi | .................... | H02M 7/537 307/43 |
| 8,716,891 B2 * | 5/2014 | Choi | ...................... | H02J 9/062 307/71 |
| 9,112,247 B2 * | 8/2015 | Yamauchi | ........... | H01M 10/482 |
| 9,178,366 B2 * | 11/2015 | Kumagai | ............... | H02J 7/007 |
| 9,310,441 B2 * | 4/2016 | Jo | ......................... | G01R 31/367 |
| 9,397,507 B2 * | 7/2016 | Mercier | .................. | B60L 50/51 |
| 9,453,869 B1 * | 9/2016 | Parkin | .................. | G01R 19/2513 |
| 9,496,730 B2 * | 11/2016 | Gallegos | ................. | B60L 50/40 |
| 9,502,960 B2 * | 11/2016 | Weyh | ...................... | H02M 1/42 |
| 9,527,401 B2 * | 12/2016 | Le | .......................... | B60L 53/22 |
| 9,577,548 B2 * | 2/2017 | Tyagi | ...................... | H02J 3/472 |
| 9,678,164 B2 * | 6/2017 | Mitsuyama | ........... | G01R 31/392 |
| 9,787,106 B2 * | 10/2017 | Huggins | .............. | H01M 10/482 |
| 9,966,759 B2 * | 5/2018 | Kumagai | .............. | H02J 7/0014 |
| 9,997,931 B2 * | 6/2018 | Mercier | ................. | H02J 7/0019 |
| 10,003,202 B2 * | 6/2018 | Garnier | ................... | B60L 58/22 |
| 10,107,865 B2 * | 10/2018 | Choi | ...................... | G01R 31/367 |
| 10,277,041 B2 * | 4/2019 | Zane | ...................... | H02J 1/002 |
| 10,298,026 B2 * | 5/2019 | Trimboli | ............... | H02J 7/0021 |
| 10,300,807 B2 * | 5/2019 | Jin | ......................... | B60L 58/26 |
| 10,615,611 B2 * | 4/2020 | Jeon | ........................ | B60L 58/22 |
| 10,742,127 B2 * | 8/2020 | Riar | ........................ | H02J 7/0063 |
| 10,938,223 B2 * | 3/2021 | Jeon | ........................ | B60L 58/22 |
| 11,183,839 B2 * | 11/2021 | Apte | ........................ | H02S 20/10 |
| 11,211,870 B2 * | 12/2021 | Moore | .................... | H02M 1/36 |
| 11,251,628 B2 * | 2/2022 | Peretz | .................... | H02J 7/0019 |
| 11,313,912 B2 * | 4/2022 | Hong | ...................... | H01M 10/42 |
| 2005/0057255 A1 * | 3/2005 | Tate, Jr. | .............. | H01M 10/486 324/426 |
| 2005/0194937 A1 * | 9/2005 | Jacobs | .................. | H02J 7/0018 320/135 |
| 2005/0231152 A1 * | 10/2005 | Welchko | ................ | B60L 53/14 318/801 |
| 2006/0152085 A1 * | 7/2006 | Flett | ...................... | H02M 7/003 307/75 |
| 2006/0261779 A1 * | 11/2006 | Maleus | .................. | H02J 7/0018 320/128 |
| 2008/0018299 A1 * | 1/2008 | Renda | .................... | B60L 58/19 320/116 |
| 2008/0074911 A1 * | 3/2008 | Petter | ...................... | H02M 1/14 363/65 |
| 2008/0084184 A1 * | 4/2008 | Ohnuki | .................. | H02J 7/345 320/116 |
| 2009/0130538 A1 * | 5/2009 | Kaita | .................... | G01R 31/374 429/61 |
| 2009/0206841 A1 * | 8/2009 | Weng | ...................... | H02J 7/005 307/64 |
| 2011/0049977 A1 * | 3/2011 | Onnerud | ............... | B60L 3/0069 307/9.1 |
| 2011/0140535 A1 * | 6/2011 | Choi | ...................... | H02J 3/382 307/82 |
| 2012/0019072 A1 * | 1/2012 | Tyagi | .................... | H02M 7/493 307/72 |
| 2012/0105001 A1 * | 5/2012 | Gallegos | ............... | H02J 7/0027 320/109 |
| 2012/0223677 A1 * | 9/2012 | Yamauchi | ........... | H01M 10/482 320/134 |
| 2013/0002030 A1 * | 1/2013 | Kumagai | ............... | H02J 7/0014 307/77 |
| 2013/0038289 A1 * | 2/2013 | Tse | ........................ | H02J 7/0013 320/126 |
| 2013/0110429 A1 * | 5/2013 | Mitsuyama | ............. | G06F 17/00 702/63 |
| 2013/0221919 A1 * | 8/2013 | Gallegos | ................. | B60L 58/16 320/109 |
| 2013/0260196 A1 * | 10/2013 | Takahashi | ........... | H01M 10/425 429/90 |
| 2014/0008987 A1 * | 1/2014 | Tyagi | ...................... | H02J 3/472 307/43 |
| 2014/0042815 A1 * | 2/2014 | Maksimovic | ........... | H02J 1/102 307/63 |
| 2014/0153294 A1 * | 6/2014 | Deboy | .............. | H02M 3/33569 363/21.04 |
| 2014/0312844 A1 * | 10/2014 | Mercier | .................. | B60L 58/12 320/118 |
| 2015/0046107 A1 * | 2/2015 | Jo | ......................... | G01R 31/367 702/63 |
| 2015/0077039 A1 * | 3/2015 | Soong | .................... | B60L 53/30 320/107 |
| 2015/0202983 A1 * | 7/2015 | Le | .......................... | B60L 50/16 320/109 |
| 2015/0256005 A1 * | 9/2015 | Huggins | .............. | H01M 10/482 320/128 |
| 2015/0286198 A1 * | 10/2015 | Sugeno | ............... | G06F 11/3058 700/295 |
| 2015/0326021 A1 * | 11/2015 | Cousineau | ............ | H02M 7/483 307/52 |
| 2015/0372279 A1 * | 12/2015 | Li | ......................... | H01M 50/502 429/50 |
| 2015/0377974 A1 * | 12/2015 | Choi | .................... | G01R 31/367 702/63 |
| 2016/0072282 A1 * | 3/2016 | Kumagai | ................ | B60L 50/51 307/51 |
| 2016/0072394 A1 * | 3/2016 | Deboy | .................. | H02M 7/217 363/21.1 |
| 2016/0084913 A1 * | 3/2016 | Lupo | .................... | G01R 31/3842 702/63 |
| 2016/0118830 A1 * | 4/2016 | Jeon | ........................ | B60L 58/22 320/127 |
| 2016/0197498 A1 * | 7/2016 | Mercier | .................. | H02J 7/007 320/118 |
| 2016/0211690 A1 * | 7/2016 | Li | ............................ | H02J 7/02 |
| 2016/0336765 A1 * | 11/2016 | Trimboli | ................ | H02J 7/005 |
| 2016/0336767 A1 * | 11/2016 | Zane | ...................... | H02J 7/0048 |
| 2017/0225584 A1 * | 8/2017 | Jin | ......................... | B60L 3/0046 |
| 2017/0264109 A1 * | 9/2017 | Garnier | .................. | H02J 7/0018 |
| 2018/0102646 A1 * | 4/2018 | Apte | ........................ | H02S 20/10 |
| 2018/0198289 A1 * | 7/2018 | Sugeno | ................. | B60L 53/63 |
| 2018/0219485 A1 * | 8/2018 | Babazadeh | ............. | H02M 1/40 |
| 2018/0248376 A1 * | 8/2018 | Teramoto | ................ | H02J 3/46 |
| 2019/0081370 A1 * | 3/2019 | Capati | ................. | H01M 10/4257 |
| 2019/0322189 A1 * | 10/2019 | Allison | ................... | B60L 53/53 |
| 2019/0375353 A1 * | 12/2019 | Hohenauer | ......... | H01M 10/425 |
| 2020/0014306 A1 * | 1/2020 | Riar | ...................... | H02M 3/33584 |
| 2020/0052504 A1 * | 2/2020 | Jeon | ........................ | B60L 58/22 |

(56) References Cited

U.S. PATENT DOCUMENTS

| | | | |
|---|---|---|---|
| 2020/0195021 A1* | 6/2020 | Hu | H02J 7/00041 |
| 2020/0343739 A1* | 10/2020 | Peretz | H02J 7/0016 |
| 2021/0006075 A1* | 1/2021 | Rentel | H01M 10/441 |
| 2021/0028503 A1* | 1/2021 | Hilligoss | H02J 7/0019 |
| 2021/0074968 A1* | 3/2021 | Herron | H01M 50/502 |
| 2021/0152016 A1* | 5/2021 | Pmsvvsv | H02J 9/061 |
| 2021/0231739 A1* | 7/2021 | Hong | H01M 10/488 |
| 2021/0359535 A1* | 11/2021 | Tseng | H02J 7/00718 |
| 2021/0399352 A1* | 12/2021 | Kamel Ahmed | H02J 7/007182 |
| 2022/0029428 A1* | 1/2022 | Ino | B60L 58/12 |

FOREIGN PATENT DOCUMENTS

| | | | |
|---|---|---|---|
| CN | 111267648 A | * | 6/2020 |
| KR | 20140132591 A | * | 11/2014 |

\* cited by examiner

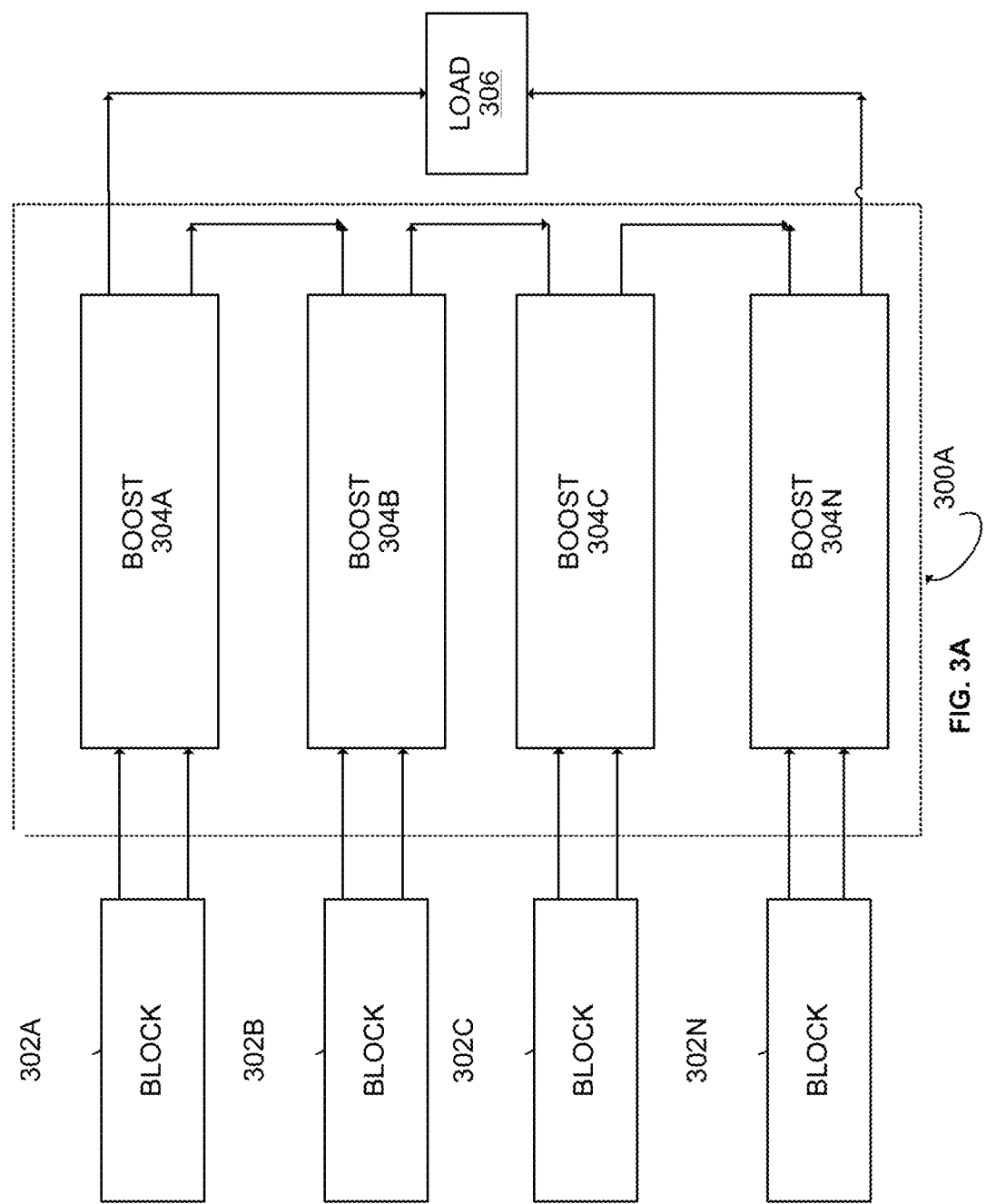

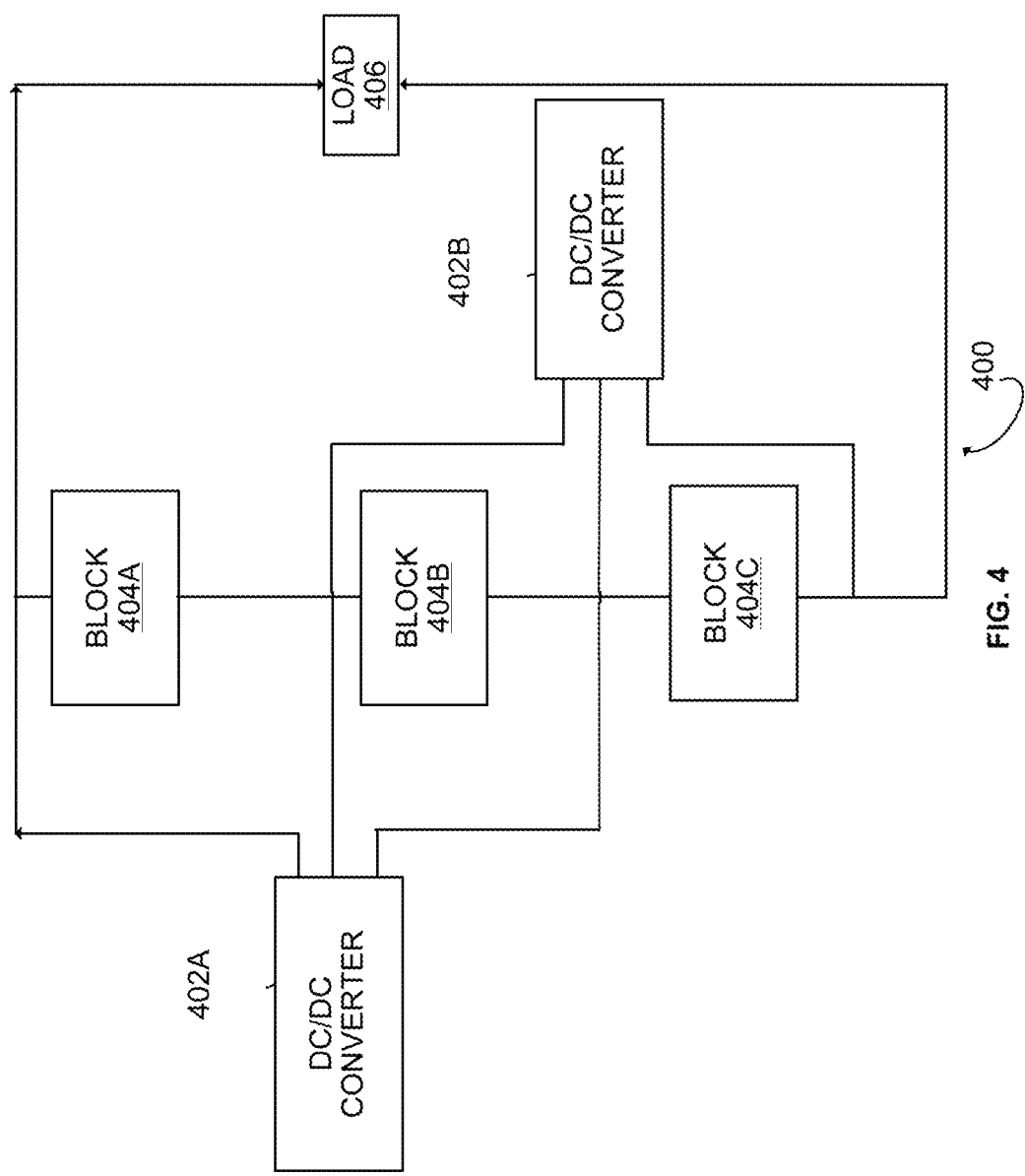

SYSTEM AND METHOD FOR DYNAMIC BALANCING POWER IN A BATTERY PACK

BACKGROUND

Technical Field

The embodiments herein generally relate to a battery management system, and more specifically to a system and method for dynamically balancing power in a battery pack during charging and discharging to maximize the usable energy of the battery pack.

Description of the Related Art

Battery systems are becoming critical in generation, transmission, distribution and use of energy. Two examples are technology for electric vehicles and integration of renewable energy for smart grid applications. The battery packs are usually formed by battery modules/cells connected in series and parallel combinations to meet the voltage, and current requirements of the connected loads like the motor.

Battery Management Systems are vital in optimizing the performance of a large number of cells (can range from hundreds to thousands depending on the cell type, cell capacity) to meet the power and energy requirement of the application. The electrical characteristics of the cells used for making the battery pack need to be closely matched. However, they will still have small manufacturing differences related to the quality and variation in the materials and the assembly process. If no corrective actions are taken, cell imbalances will increase with time as charge and discharge cycles are performed on the battery, resulting in a situation where, although most cells may have closely matched capacities, a few cells will reach a state of overcharge or deep-discharge due to degraded capacities and higher electrical resistances. Thus, when charging batteries, some cells reach full charge long before others. Likewise, weaker cells will tend to discharge much more rapidly than the rest of the pack. This leads to under-utilization of most of the cells. In summary, when these imbalanced batteries are left in use without any control, such as cell equalization, the energy storage capacity decreases severely. In extreme situations this can lead to a significant deterioration of the battery that along with other external factors can raise a premature failure of the entire system. The severity and rapidity with which both the imbalance and deterioration occur largely depends on such factors as usage pattern, cell chemistry, environmental conditions and several other factors. Lithium-ion cells are very intolerant to overcharge or deep-discharge conditions, which may damage the battery, shortening its lifetime and even causing hazardous situations. There are many reports in the literature which describe the level of uneven ageing of cells. One of the studies (e.g. Baumhofer ("Production caused variation in capacity aging trend and correlation to initial cell performance", Journal of Power Sources, 247, 1 Feb. 2014, 332-338 (2014)) on Li-Ion 18650 cells and observed capacity dispersion as high as 25% to 84% when the cells were cycled from 850 to 1500 cycles (see FIG. 1 of Baumhofer).

To deal with the cell imbalance issue of battery packs, various battery balancing systems have been developed. Passive balancing is one of the most widely used methods in battery management systems because of the advantage of low cost. The operating principle of passive balancing is simple: when a single cell/module reaches the charge voltage limit before all the other cells have reached their capacity, it will be discharged by a power resistor to allow other cells to be fully charged. However, passive balancing is only applied during the charge process instead of for both charge and discharge. The bleeding current is usually kept low (typically between 50 mA and 1.5 A) to keep the heat generated during discharge in check. It tends to lengthen charging time as the battery age with increasing dispersion. In addition, the overall efficiency of the battery system with passive balancing is relatively low due to the balancing energy being dissipated as heat.

In contrast, active balancing circuits equalize the battery by transferring energy from cells with higher state-of-charge (SOC) to cells with lower SOC and can be operated during both charge and discharge processes. There are three types of state-of-the-art active balancing systems—Capacitive Balancing, Inductive Balancing and Mixed Active Balancing. One disadvantage of conventional active battery balancing systems is the power loss during the balancing operation. The power loss wastes the useable energy of the whole battery pack. In addition to active balancing circuit hardware, it is also necessary to implement appropriate balancing algorithms, considering battery chemistry, battery pack design and application requirements. Active balancing battery system improves cell life and capacity utilization as compared to passive balancing systems. However, for both active and passive balancing schemes, moving the extra energy out from higher SOC cells leads to extra cycling of those cells, and this extra cycling effectively leads to faster aging of the cells and reduces the life of the battery. For the active balancing schemes the shuffling of energy is done between adjacent cells, and this limits its ability to remove mismatch between cells that are further apart. For electric vehicle battery packs which can be made of thousands of cells, this can be a real issue, as it is very likely that degraded cells will not be next to each other. This reduces the overall balancing efficacy. Further, since these cells are all connected in series they can still severely limit each other and the overall battery performance due to significant mismatch.

The cost of the electronic circuitry and the components used increases rapidly with their current carrying capacity. Therefore, to keep the costs in check the balancing circuits in both passive and active balancing topology operate at very low currents. So, the time required for balancing may be quite high and significantly depends on the amount of mismatch to be balanced out. This extra time required for balancing with active or passive schemes slows down the overall process of charging and is a significant overhead especially as the cells age and their mismatch increases.

Accordingly, there remains a need for a battery management system and method for dynamically balancing power in a battery pack during charging and discharging to alleviate the above described deficiencies in conventional systems.

SUMMARY

In view of the foregoing, an embodiment herein provides a battery management system for dynamically balancing power in a battery pack by providing an independently determined current for each block during charging and discharging and by allowing different currents through each cell to maximize available energy of the battery pack. The battery management system includes the battery pack and a control unit. The battery pack includes one or more modules. Each of the one or more modules includes one or more bricks. Each of the one or more bricks includes one or more blocks that are electrically connected in at least one of (i) a series configuration or (ii) a parallel configuration. Each of the plurality of blocks includes one or more cells that are electrically connected in at least one of (i) a series configuration or (ii) a parallel configuration. The control unit is operatively connected across each of the one or more blocks for processing power from each of the one or more blocks irrespective of a power mismatch between the one or more blocks. The control unit includes one or more converters connected together in one of a series configuration or a parallel configuration. The control unit dynamically balances the power in the battery pack by controlling a differential current, using the plurality of converters, for flowing the differential current from a first block from among the one or more blocks associated with a higher SOC to a second block from among the one or more blocks associated with a lower SOC, thereby maximizing energy of the battery pack during charging and discharging (where the term "maximizing" refers to significantly increasing, and may or may not correspond to a true maximum).

In some embodiments, the control unit includes the one or more converters operatively connected together in a series configuration across a load circuit. In some embodiments, each of the one or more converters is operatively connected to one of the one or more blocks. In some embodiments, the one or more converters include buck boost converters.

In some embodiments, the control unit includes the one or more converters operatively connected together in a parallel configuration across a load circuit. In some embodiments, each of the one or more converters is operatively connected to one of the one or more blocks. In some embodiments, the one or more converters include buck boost converters.

In some embodiments, the control unit includes the one or more converters. In some embodiments, each of the one or more converters comes into operation only in an event of a power mismatch and processes only mismatched current between the one or more blocks, else the one or more converters are bypassed from the path of power flow.

In some embodiments, each converter from among the one or more converters is operatively connected between two adjacent blocks from among the one or more blocks, such that power is shuffled between a weak block and a strong block and the power mismatch is eliminated. In some embodiments, a ground of each of the one or more converters is connected between the two adjacent blocks from among the one or more blocks.

In some embodiments, each of the one or more converters is an isolated buck boost converter. A buck boost converter comprises switching circuit elements and other electrical elements like inductors, capacitors and diodes. The buck boost converter circuit has the ability to both increase or decrease the source current by modifying the switching circuit element behavior. In some embodiments, each of the one or more converters is operatively connected between two adjacent blocks from among the one or more blocks, and the output of each of the one or more converters is connected in a parallel configuration across a load circuit.

In some embodiments, a first converter from among the one or more converters is operatively connected across a weak block so as to compensate for a current in a corresponding one or more blocks in series configuration and to remove a power mismatch. In some embodiments, the current at an input of the first converter is obtained from a DC link. In some embodiments, the DC link is a power bus connected with one or more converters. In some embodiments, each of the one or more converters is an isolated buck boost converter.

In some embodiments, the one or more converters are connected to form a feed-backward circuit. In some embodiments, the amount of the mismatched current is pulled from a DC link by the one or more converters connected in parallel to one or more weak blocks and an extra current compensates for a lower current output from the one or more weak blocks, thereby maintaining an overall current of a string equal to the current of one or more strong blocks. In some embodiments, the DC link is a power bus connected with one or more converters.

In some embodiments, the one or more converters are connected to form a feed-forward circuit. In some embodiments, in the feed-forward circuit, power equalization is performed by rerouting excess current from one or more strong blocks into the one or more converters connected across the one or more strong blocks and sent to the load circuit, thereby maintaining an overall current of a string equal to the current of one or more weak blocks.

In some embodiments, the one or more converters manages a power mismatch by measuring a magnitude of time varying currents as a complex function of mismatched current, and the currents are controlled by choosing an appropriate duty cycle of one or more switches. In some embodiments, the one or more converters includes a series of nested bidirectional buck-boost converters with the one or more switches. In some embodiments, the one or more switches includes a shunt switch.

In some embodiments, a current is controlled to a constant value of zero in the battery management system, or an average current in the battery management system is made zero over a period by toggling controls to produce the current with positive amplitude for a duration and the equal current with negative amplitude for the same duration, or ensuring the magnitude and duration of positive current is balanced by the magnitude and duration of negative current to obtain a net zero average current.

In some embodiments, the battery management system goes to a hibernate mode for conserving energy.

In some embodiments, the battery management system performs a method of estimating state of charge (SOC) using measured current, cumulative charge delivered in a cycle and voltage for regulating the power mismatch among the one or more blocks. The method includes the steps of: (i) measuring an open circuit voltage of the one or more blocks while the one or more blocks is at rest; (ii) determining an initial SOC by correlating with the open circuit voltage, using a lookup table stored in a controller or controller microprocessor non volatile memory element; and (iii) determining a SOC of each of the one or more of the blocks during charging and/or discharging as an integral of current of each block, which is an amount of charge moved in or out of the one or more blocks from the initial SOC, using the initial and subsequent SOC to indicate mismatch among the one or more blocks.

In some embodiments, the battery management system performs a method of estimating a state of health (SOH) using a time integral of measured current and voltage for regulating power mismatch among the one or more blocks. In some embodiments, the measured current is used to estimate remaining capacity of the block and provide its ratio to a nameplate capacity of the one or more blocks. The method includes the steps of: (i) measuring an open circuit voltage of the one or more blocks while the one or more blocks is at rest; (ii) determining an initial SOC by correlating with the open circuit voltage, using a lookup table stored in a controller or controller microprocessor non volatile memory element; (iii) determining the capacity of each of the one or more blocks during charging and/or discharging as an integral of current of each block, which is an amount of charge deviated from the initial SOC, by fixing the initial SOC as an initial mismatch among the one or more blocks; and (iv) determining SOH of each block by normalizing the capacity of each block to its nameplate capacity, using the initial SOC mismatch and the measured SOH of the plurality of blocks to determine the individual currents during charging or discharging to ensure that when the cycle ends, and the plurality of blocks have controlled or no remaining mismatch.

In some embodiments, the battery management system uses Kalman filtering to determine the SOC and state of health (SOH) of the one or more blocks by prognostics and using a machine learning model.

In one aspect, a method for dynamically balancing power in a battery pack by providing an independently determined current for each block during charging and discharging by maximizing available energy of the battery pack is provided. The method includes (i) providing a battery pack that includes one or more modules, wherein each of the one or more modules includes one or more bricks, wherein each of the one or more bricks includes the one or more blocks that are electrically connected in one of a series configuration or a parallel configuration, wherein each of the one or more blocks includes one or more cells that are electrically connected in at least one of (i) a series configuration or (ii) a parallel configuration; and (ii) using a control unit that is operatively connected across each of one or more blocks that processes power independently from each of the one or more blocks irrespective of a power mismatch between the one or more blocks. The control unit includes one or more converters connected together in one of a series configuration or a parallel configuration. The control unit dynamically balances the power in the battery pack by controlling a differential current, using the one or more converters, for flowing the differential current from a first block from among the one or more blocks associated with a higher SOC to a second block from among the one or more blocks associated with a lower SOC, thereby maximizing energy of the battery pack during charging and discharging.

In some embodiments, the power in the battery pack is dynamically balanced by independent currents for each block, wherein the method comprises (i) determining an initial State Of Charge (SOC) of each of the one or more blocks of the battery pack; (ii) calculating a difference for each of the one or more blocks for at least one of a higher limit or a lower limit of the SOC of each of the one or more blocks during charging and/or discharging; (iii) determining a maximum half cycle time among the one or more blocks based on a targeted current and one or more differential currents associated with each of the one or more blocks; and (iv) calculating a differential delta among the one or more blocks by determining a difference of SOC of the blocks present in the battery pack as the differential current.

In yet another embodiment, the method includes the allowing each block in the battery pack with an independent pre-determined current and controlling the current to be a constant value of zero or having an average zero current flowing into or out of each of the one or more blocks for maintaining a fixed value of SOC for each of the one or more blocks.

In some embodiments, the method includes, during charging of each of the one or more blocks, controlling an applied level of voltage independently in each of the one or more blocks of the battery pack changing the charging paradigm from constant current to constant voltage regime for each block as required.

In some embodiments, the method includes, during charging each of the one or more blocks, controlling bypass current that dynamically balances current and removes mismatching of SOC of each of the one or more blocks.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A illustrates a power processing distributed power control system connected in a series configuration, according to some embodiments herein;

FIG. 4 illustrates a differential power processing distributed power control system, according to some embodiments herein;

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a battery management system and method for dynamically balancing power in a battery pack during charging and discharging by maximizing the energy of the battery pack.

Figure 1:
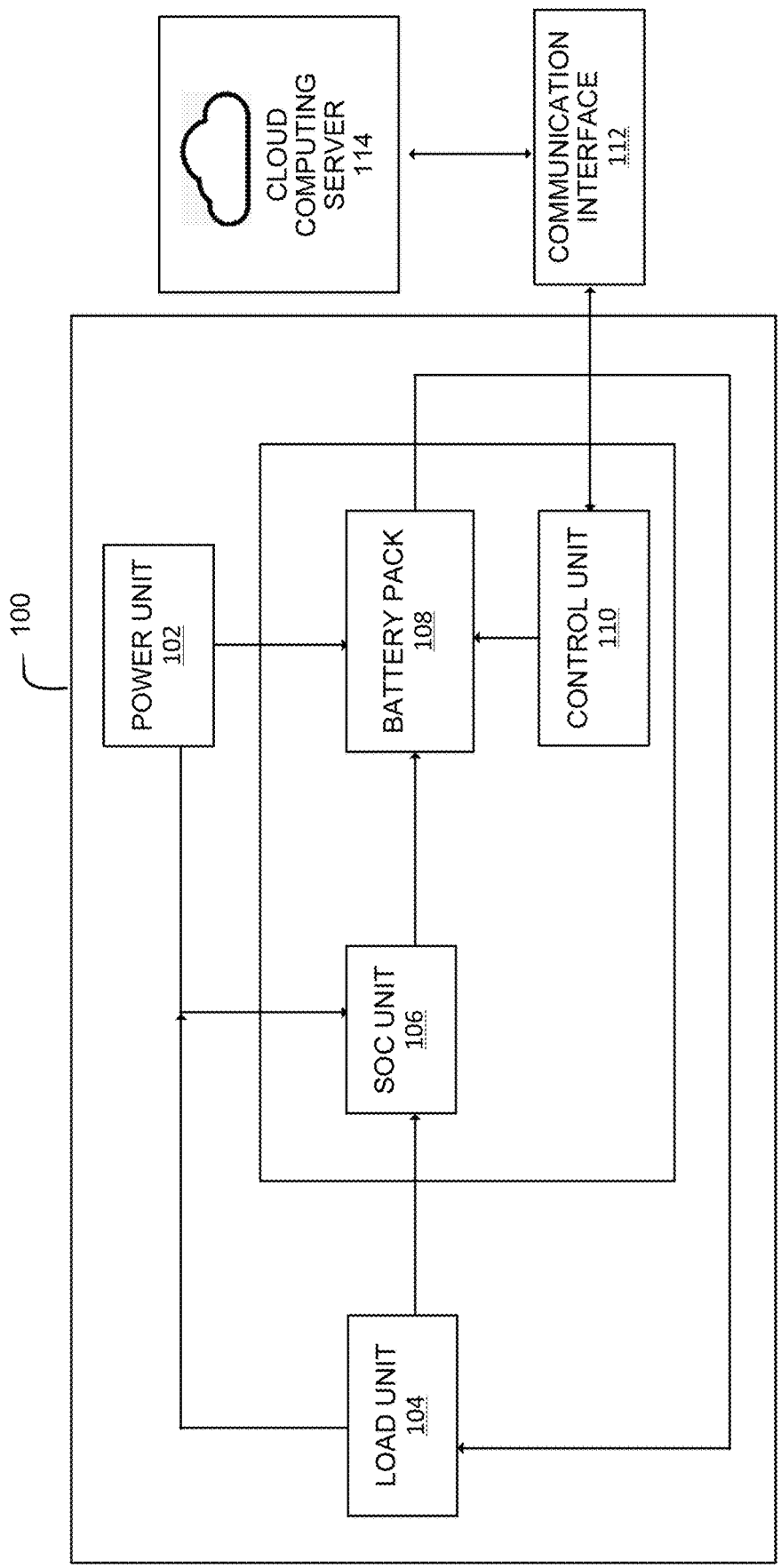
FIG. 1 illustrates a block diagram of a battery management system according to some embodiments herein.

FIG. 1 illustrates a block diagram of a battery management system 100 according to some embodiments herein. The battery management system 100 includes a power unit 102, a load unit 104, a state of charge (SOC) unit 106, a battery pack 108, a control unit 110. The power unit 102 (e.g., a direct-current (DC) or an alternating current (AC) power supply) generates a voltage for use by the load unit 104. In an event, if the power unit 102 fails to provide the necessary voltage to the load unit 106, the battery pack 108, which includes at least one battery, supplies the voltage to the load unit 104. The battery pack 108 includes one or more modules. Each module includes one or more bricks. Each brick includes one or more blocks. Each block includes one or more cells. In some embodiments, each brick possesses an energy of around 640 watt-hour (Wh) and 12 Volts. In some embodiments, one or more bricks may remove the power mismatch at the block level. In some embodiments, the power unit 102 and one or more control units (e.g. the control unit 110) may be used to remove the power mismatch at the cell level. In some embodiments, circuit transistors and passive elements like inductors and capacitors of the power unit 102 may be used for managing the performance of the battery management system 100. In some embodiments, the power unit 102 may monitor each block and modify current to change its charging or discharging in a fine-grained controlled manner. The blocks are electrically connected in one of a series configuration or a parallel configuration. The one or more cells are electrically connected in one of a series configuration or a parallel configuration.

The control unit 110 is connected with the battery pack 108 across each of the one or more blocks for processing power from each of the one or more blocks irrespective of a power mismatch between the one or more blocks. The control unit 110 includes one or more converters connected together in at least one of (i) a series configuration or (ii) a parallel configuration across the load unit 104. The control unit 110 dynamically balances the power in the battery pack 108 and thereby maximizes the available energy of the battery pack 108 during charging and discharging. The control unit 110 dynamically balances the power in the battery pack 108 by controlling a differential current, using the one or more converters, from a block associated with a higher state of charge (SOC) to a block associated with a lower SOC. In some embodiments, the one or more converters are operatively connected in a series configuration across the load unit 104. In some embodiments, the one or more converters are operatively connected to the one or more blocks of the battery pack 108. In some embodiments, one or more converters include buck boost converters. In some embodiments, each of the one or more converters comes into operation only in an event of a power mismatch and processes only mismatched current between the one or more blocks, else the one or more converters are bypassed from the path of power flow. In some embodiments, each converter from among the one or more converters is operatively connected between two adjacent blocks from among the one or more blocks, such that power is shuffled between a weak block and a strong block and the power mismatch is eliminated. In some embodiments, a first converter from among the one or more converters is operatively connected across the weak block to compensate for current in a corresponding one or more blocks in series configuration and to remove the power mismatch. In some embodiments, the current at an input of the first converter is obtained from a DC link. In some embodiments, the DC link is a power bus connected with one or more converters.

In some embodiments, a ground of each of the one or more converters is connected between two adjacent blocks. In some embodiments, each of the one or more converters is an isolated buck boost converter. In some embodiments, each of the one or more converters is operatively connected between two adjacent blocks, and output of the each of the one or more converters is connected in a parallel configuration across the load unit 104.

The one or more converters are connected to form a feed-backward circuit. The amount of the mismatched current is pulled from a DC link by the one or more converters connected in parallel to one or more weak blocks and an extra current compensates for lower current output from the one or more weak blocks. In some embodiments, an overall current of the string of blocks is equal to the current of one or more strong blocks. By pulling the current from the DC link the current of the weak blocks can be increased to the same value as the strong blocks implying faster charging or better support of the load. In some embodiments, one or more converters are connected to form a feed-forward circuit. In the feed-forward circuit, power equalization is done by rerouting excess current from one or more strong blocks into the one or more converters connected across the one or more strong blocks for sending to the load unit 104 (e.g. load circuit), thereby maintaining an overall current of the string of blocks equal to the current of the one or more weak blocks. In some embodiments, the one or more converters manages power mismatch by measuring a magnitude of time varying currents as a complex function of mismatched current and the currents are controlled by choosing an appropriate duty cycle of one or more switches (see FIG. 7 below). In some embodiments, the one or more converters includes a series of nested bidirectional buck-boost converters with the one or more switches. In some embodiments, a current is controlled to a constant value of zero in the battery management system or an average current in the battery management system 100 is made zero over a period by toggling control to produce the current with positive amplitude for a duration and the equal current with negative amplitude for the same duration, or ensuring the magnitude and duration of positive current is balanced by the magnitude and duration of negative current to obtain a net zero average current. As a zero current is desired when a block goes to a fully charged or discharged state, including this control at each block level may provide flexibility during charging and discharging.

The SOC unit 106 is connected to the battery pack 108, the load unit 110, and the power unit 102. The SOC of the battery pack 108 can be calculated to allow the battery management system 100 to control a rate of charging and discharging within operating ranges. In some embodiments, the SOC unit 106 estimates SOC among the one or more blocks for regulating the power mismatch among them using the measured current, the cumulative charge delivered in a cycle, and the voltage. The SOC of each block is estimated by (i) measuring an open circuit voltage of the one or more blocks while the one or more blocks is at rest, (ii) determining an initial SOC by correlating with the open circuit voltage using a lookup table stored in a controller or controller microprocessor non volatile memory element and (iii) determining a SOC of each of the plurality of the blocks during charging or discharging as an integral of the current of each block, which is an amount of charge moved in or out of the one or more blocks from the initial SOC, using the initial and subsequent SOC to indicate mismatch among the one or more blocks. The battery management system 100 estimates State of Health (SOH) of each block using measured current and voltage for regulating power mismatch among one or more blocks, by (i) measuring an open circuit voltage of the one or more blocks while the one or more blocks is at rest, (ii) determining an initial SOC by correlating with the open circuit voltage, using a lookup table stored in the controller or controller microprocessor non volatile memory element, (iii) determining a SOC of each of the plurality of the blocks during charging or discharging as an integral of the current of each block, which is an amount of charge deviated from the initial SOC by fixing the initial SOC as an initial mismatch among the one or more blocks, and (iv) determining SOH of each block by calculating a ratio of the capacity of each block to its nameplate capacity, using the initial SOC mismatch and the measured SOH of the plurality of blocks to determine the individual currents during charging or discharging to ensure that when the cycle ends the plurality of blocks have controlled or no remaining mismatch. In some embodiments, the measured current is used to estimate remaining capacity of the block and provide its ratio to a nameplate capacity of the one or more blocks. In some embodiments, the battery management system 100 uses Kalman filtering (see e.g., "Extended Kalman filtering for battery management systems of LiPB-based HEV battery packs: Part 1. Background" Gregory L. Platt, Journal of Power Sources, 134, 2, 252-261 (2004)) to determine the SOC and state of health (SOH) of one or more of the blocks by prognostics and using a machine learning model. In some embodiments, real-time data associated with the block, the values of the SOC, the SOH, temperature, voltage, current, of each block are stored in a cloud computing server 114 using a communication interface 112 at a regular interval of time. In some embodiments, the SOC and the SOH are determined at the cloud server. In some embodiments, data associated with the battery pack 108, which is circuit control parameters for each block, targeted mismatch currents, operating conditions, system faults, and operating states are stored in the cloud server.

In some embodiments, the battery management system 100 manages the battery pack 108 when any one of the blocks among the one or more blocks in the battery pack 108 is open (e.g. In case the connection of a particular block disconnects or the block gets damaged and results in an open circuit).

The control unit 110 operates to dynamically balance power in the battery pack 108 by independent currents for each block by (i) determining an initial State Of Charge (SOC) of each of the one or more blocks of the battery pack 108, (ii) calculating a difference for each of the one or more blocks for at least one of a higher limit or a lower limit of the SOC of the one or more blocks during charging and/or discharging, (iii) determining a maximum half cycle time among the one or more blocks based on a targeted current and the differential currents associated with each of the one or more blocks, and (iv) calculating a differential delta among the one or more blocks by determining a difference of SOC of the blocks present in the battery pack 108 as the differential current. In an exemplary scenario, for example, if an inductor in a converter carries a current of 6 Amperes within a safe operating range, and for example, if the load current is 5 Amperes, then the additional current that is allowed through the inductor is 1 Ampere. This means 0.33 C rate of current is allowed in each cell of the block which is the same as the mismatched SOC among the blocks.

In another exemplary scenario, for example, if SOC of block1 is 20%, SOC of block2 is 30%, SOC of block3 is 40%, SOC of block4 is 20%, Itarget=6 A based on C-rate, and SOC charging limit is 95%, then the maximum time to charge a block which has the maximum delta SOC, for example for block1, can be calculated as $$T_{cycle}=((\Delta SOC12/2)/\text{inductor current})*\text{capacity}*60,$$
where capacity is the block capacity.

$$T_{cycle} \text{ for block1}=((95\%-20\%)/6)*18*60=135 \text{ minutes}.$$

Since, there are 135 minutes for charging, the inductor current is calculated into resolve the mismatch these 135 minutes using $$\text{Iind}=((\Delta SOC/2)/T_{cycle})*\text{capacity}*60.$$

$$\Delta SOC12=SOC1-SOC2=20\%-30\%=-10\%$$

$$\Delta SOC34=SOC3-SOC4=40\%-20\%=20\%$$

$$\Delta SOC12-34=-10\%$$

Hence, by using the values calculated for ΔSOC, the inductor current for each converter is obtained as −0.4 A $$\text{Iind1}=(SOC1-SOC2=20\%-30\%=-10\%/2)/135)$$
$$*60*18=-0.4 \text{ Amperes. } S$$

$$\text{Iind2}=-(0.1/2/135)*60*18=-0.4A,$$

$$\text{Iind3}=(0.2/2/135)*60*18=0.8A.$$

As can be seen from the above example, the inductor currents to eliminate the mismatch can all be supported by minimizing the amount of processed power and keeping the losses to a minimum.

Figure 7:
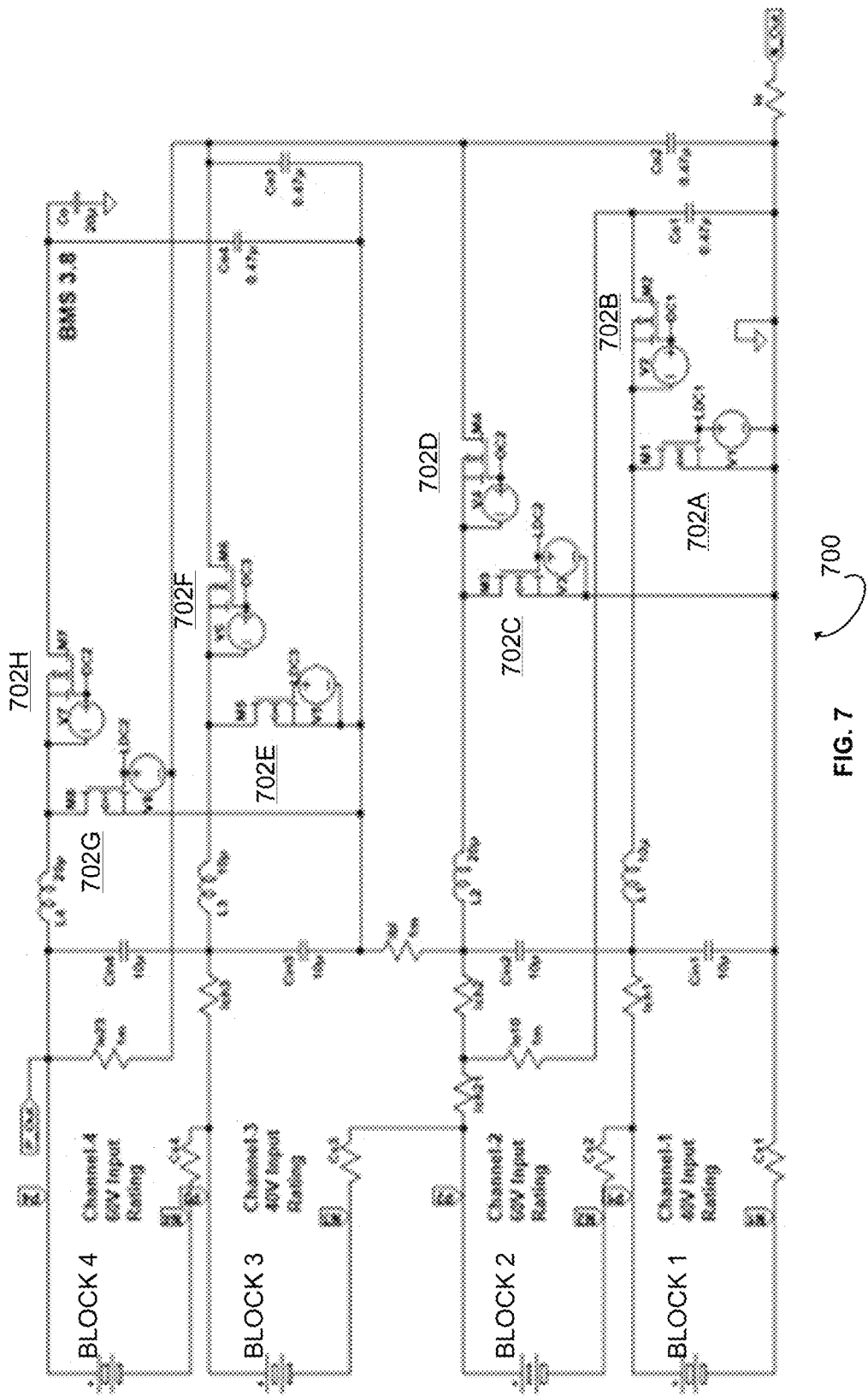
FIG. 7 illustrates a circuit schematic representation of an interleaved DC-DC converter scheme in the battery management system according to some embodiments herein.

In some embodiments, to keep the inductor current on target the current in each circuit is controlled by adjusting a duty cycle of the switching transistors (see FIG. 7). If the measured current of the inductor is greater than the sum of the threshold current of the inductor and the targeted current of the inductor, then the duty cycle is incremented. If the measured current of the inductor is within the range of targeted current of the inductor, then the duty cycle is unchanged. If the measured current of the inductor is less than the range of targeted current of the inductor, then the duty cycle is decremented. In some embodiments, to maintain the desired inductor current for a calculated time interval of each balancing block, a direction in which current flows is determined and thus the duty cycle is regulated.

In some embodiments, for dynamic balancing in the battery pack 108, the currents being bypassed (i.e. differential currents resulting from mismatch between blocks) are made to change continually depending on the instantaneous mismatch. In some embodiments, the balancing bypass currents are calculated using machine learning techniques based on historical charge and discharge cycles during the electric vehicle operations due to anticipated acceleration and regenerative braking, among other possible variables.

In some embodiments, for maintaining a fixed value of SOC for each of one or more blocks, the control unit 110 controls an average zero current flowing into or out of each of one or more blocks. In some embodiments, during the charging of each of one or more blocks, the control unit 110 controls an applied level of voltage independently in each of one or more blocks of the battery pack 108 changing the charging paradigm from constant current to constant voltage regime for each block as required. This helps to achieve independent control of the charging characteristics of each block based on its SOC and SOH, since the voltage level at which the transition happens from Constant Current (CC) to Constant Voltage (CV) can be different for each block. In some embodiments, during charging each of one or more blocks, the control unit 110 controls bypass current that dynamically balances current and removes mismatch of SOC of each of one or more blocks. In some embodiments, the battery management system 100 goes to sleep mode for conserving energy. Sleep mode can be triggered by monitoring of load currents, and can be performed by the control system.

Figure 2:
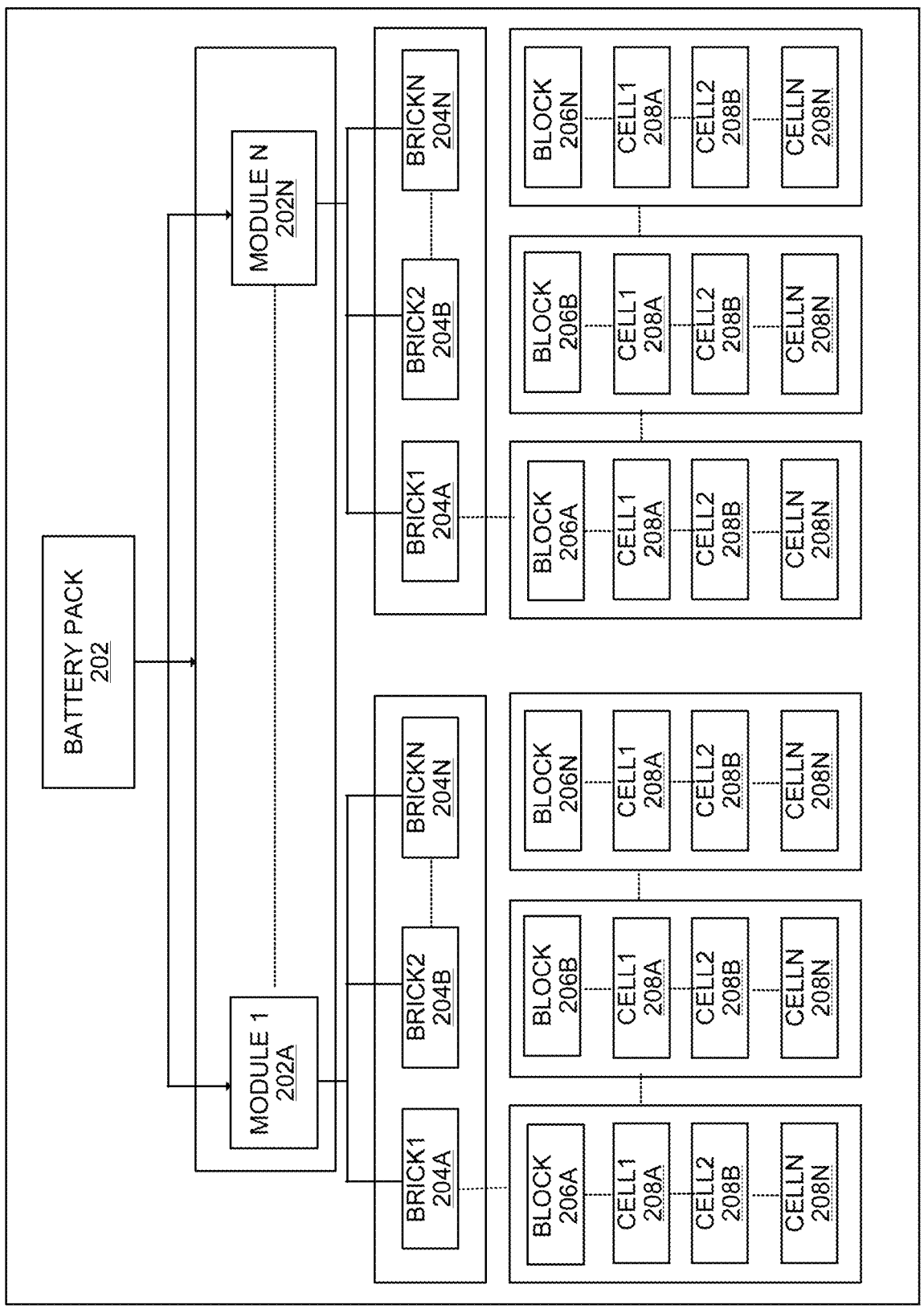
FIG. 2 illustrates a hierarchical representation of a battery pack in a battery management system according to some embodiments herein.

FIG. 2 illustrates a hierarchical representation of a battery pack 108 in a battery management system 100 according to some embodiments herein. The battery pack 108 includes one or more modules 202A-N Each module includes one or more bricks 204A-N. Each brick includes one or more blocks 206A-N connected in one of a series configuration or a parallel configuration. Each block includes one or more cells 208 A-N connected in a series configuration or parallel configuration. In some embodiments, each brick possesses the energy of around 640 Wh and 12 Volts. In some embodiments, the one or more bricks 204A-N removes power mismatch at the block level. In some embodiments, a power circuit and one or more control units (e.g. the control unit 110) may be used to remove the power mismatch at the block level. In some embodiments, the transistors and inductors of the power circuit may be used for managing the performance of the battery management system 100. In some embodiments, the power circuit may monitor each block and modify current to change its charging or discharging in a fine-grained controlled manner. In some embodiments, each block may include lithium-ion energy cells around energy 10 Wh and/or lead-acid cells around 40 Wh. In some embodiments, the one or more modules 202A-N are connected in a series or parallel configuration in the battery pack 202 to meet the current and voltage requirements of the powertrain of an electric vehicle/device. In some embodiments, this design of battery pack 202 addresses the power mismatch at each block/cell level.

FIG. 3A illustrates a power processing distributed power control system 300A connected in a series configuration, according to some embodiments herein. Distributed power control system 300A is an example of control unit 110. One or more blocks 302A-N are connected to the power processing distributed power control system 300A through, one or more converters 304A-N (labeled as "BOOST"), and a load circuit 306. The one or more converters 304A-N are configured together in a series configuration across the load circuit 306 (e.g. load unit 104). The one or more converters 304A-N is configured to connect to one of the blocks 302A-N of the battery pack 108. The one or more converters 304A-N may include a buck boost converter. In some embodiments, the one or more converters 304A-N is connected across each block of the battery pack 108. The power from each block 302A of the battery pack 108 is processed irrespective of power mismatch among one or more blocks of the battery pack 108.

Figure 3B:
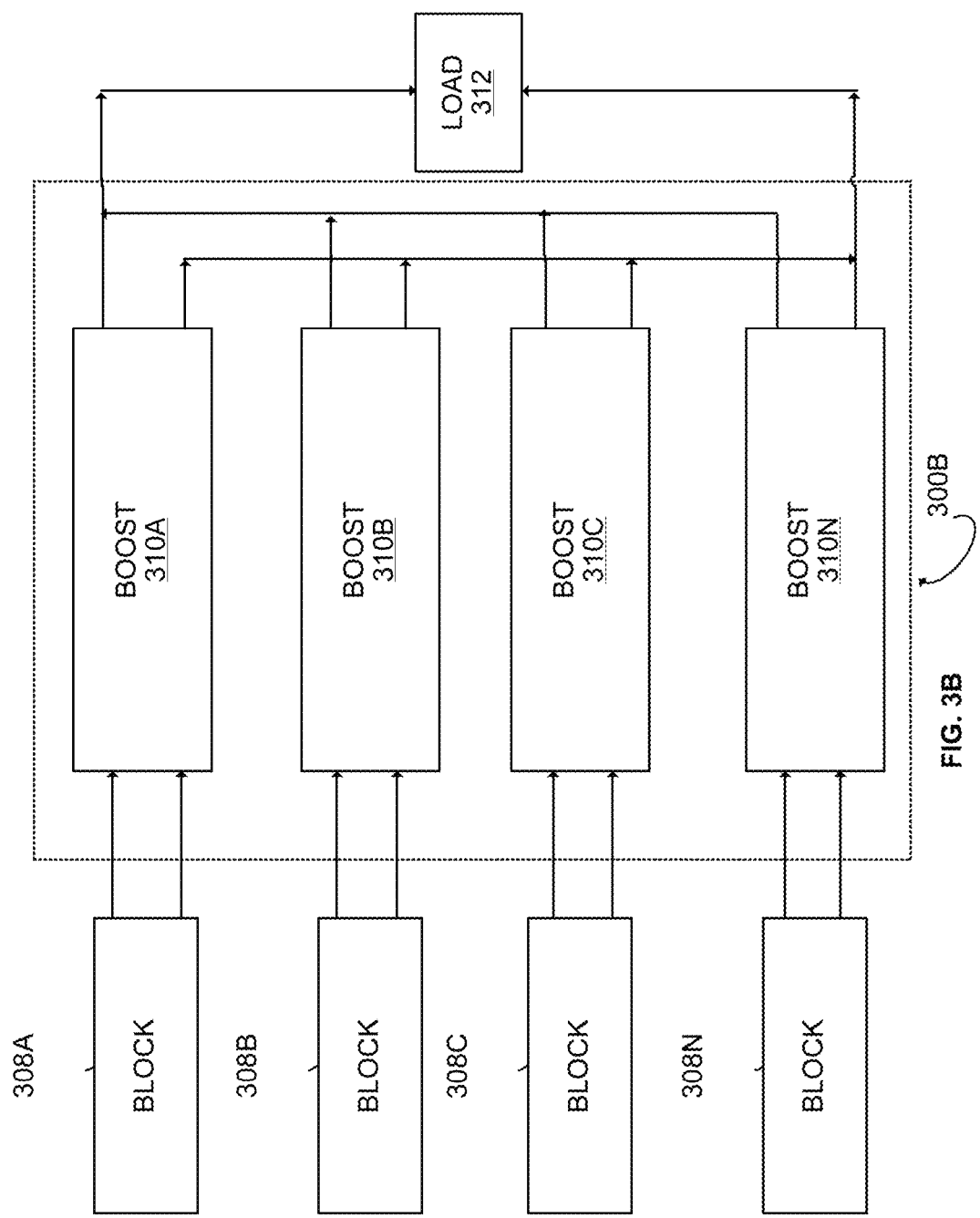
FIG. 3B illustrates a power processing distributed power control system connected in a parallel configuration, according to some embodiments herein.

FIG. 3B illustrates a power processing distributed power control system 300B connected in a parallel configuration, according to some embodiments herein. Distributed power control system 300B is another example of control unit 110. One or more blocks 308A-N are connected to the power processing distributed power control system 300B through, one or more converters 310A-N, and a load circuit 312. The one or more converters 308A-N is configured together in a parallel configuration across the load circuit 312 (e.g. load unit 104). The one or more converters 310A-N is configured to connect to one of the blocks 308A of the battery pack 202. The one or more converters 310A-N may include a buck boost converter. In some embodiments, the one or more converters 310A-N is connected across each block 308A of the battery pack 108. The power from each block 308A of the battery pack 108 is processed irrespective of mismatch among one or more blocks 308A-N of the battery pack 108.

FIG. 4 illustrates a differential power processing distributed power control system 400, according to some embodiments herein. One or more blocks 404A-C are connected to the differential power processing distributed power control system 400 which includes one or more DC-DC converters 402A, 402B (which may be included in control unit 110), and a load circuit 406 (e.g. load unit 104). Each converter 402A or 402 B operates only when there is a power mismatch between two adjacent blocks in the battery pack 108. In some embodiments, the power is shuffled between a weak block and a strong block, and the power mismatch is eliminated.

Figure 5:
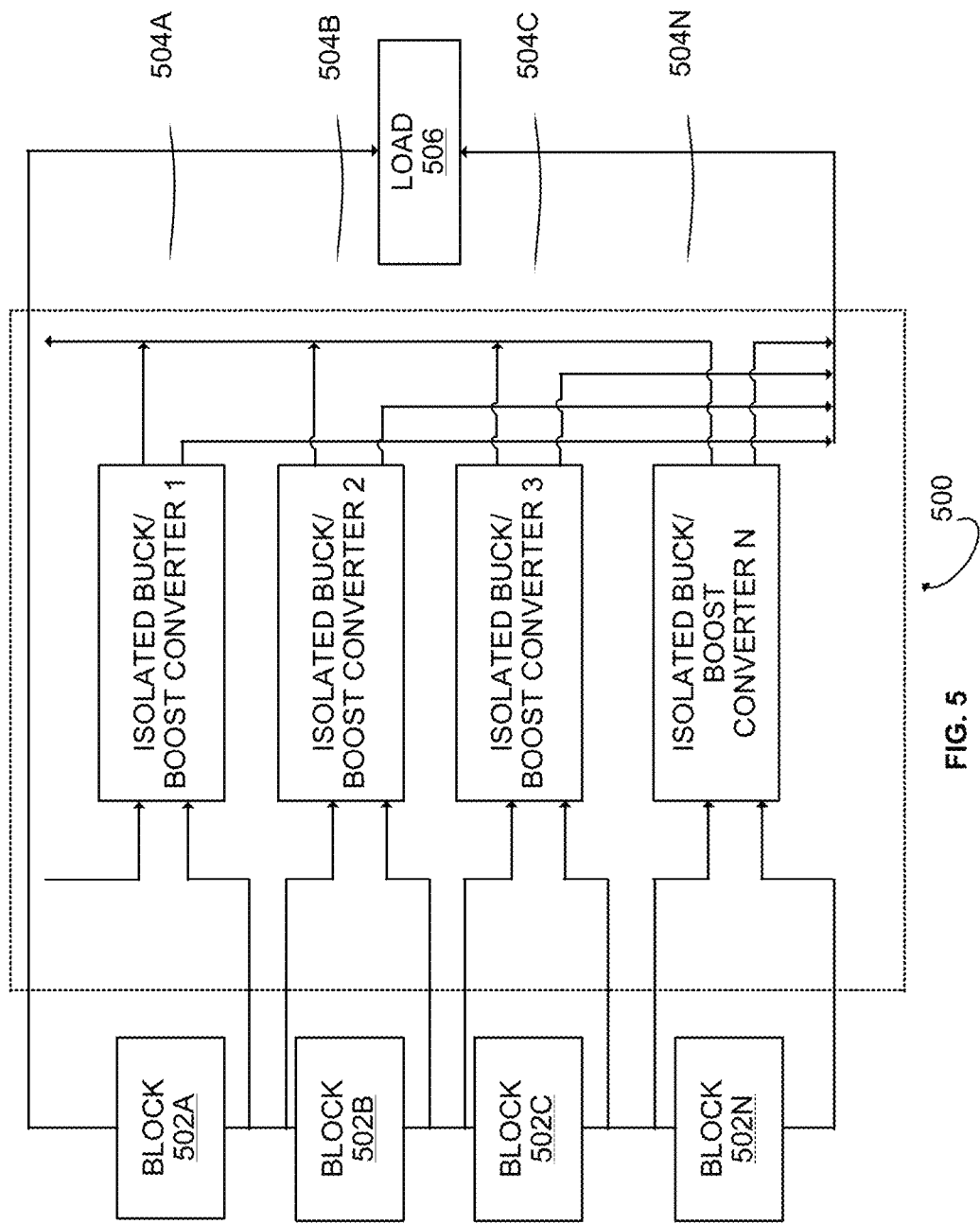
FIG. 5 illustrates a differential power processing distributed power control system with returned energy current converter, according to some embodiments herein.

FIG. 5 illustrates a differential power processing distributed power control system 500 with a returned energy current converter, according to some embodiments herein. System 500 is an example of control unit 110. In system 500, one or more blocks 502A-N, are connected to the differential power processing distributed power control system 500 which includes, one or more converters 504A-N, and a load circuit 506. In some embodiments, each of the one or more converters 504A-N includes an isolated buck boost converter. Each converter 504A is configured between two adjacent blocks from among the blocks of the battery pack 108. The output of each converter 504A-N is connected in a parallel configuration across the load circuit 506 (e.g. load unit 104).

Figure 6A:
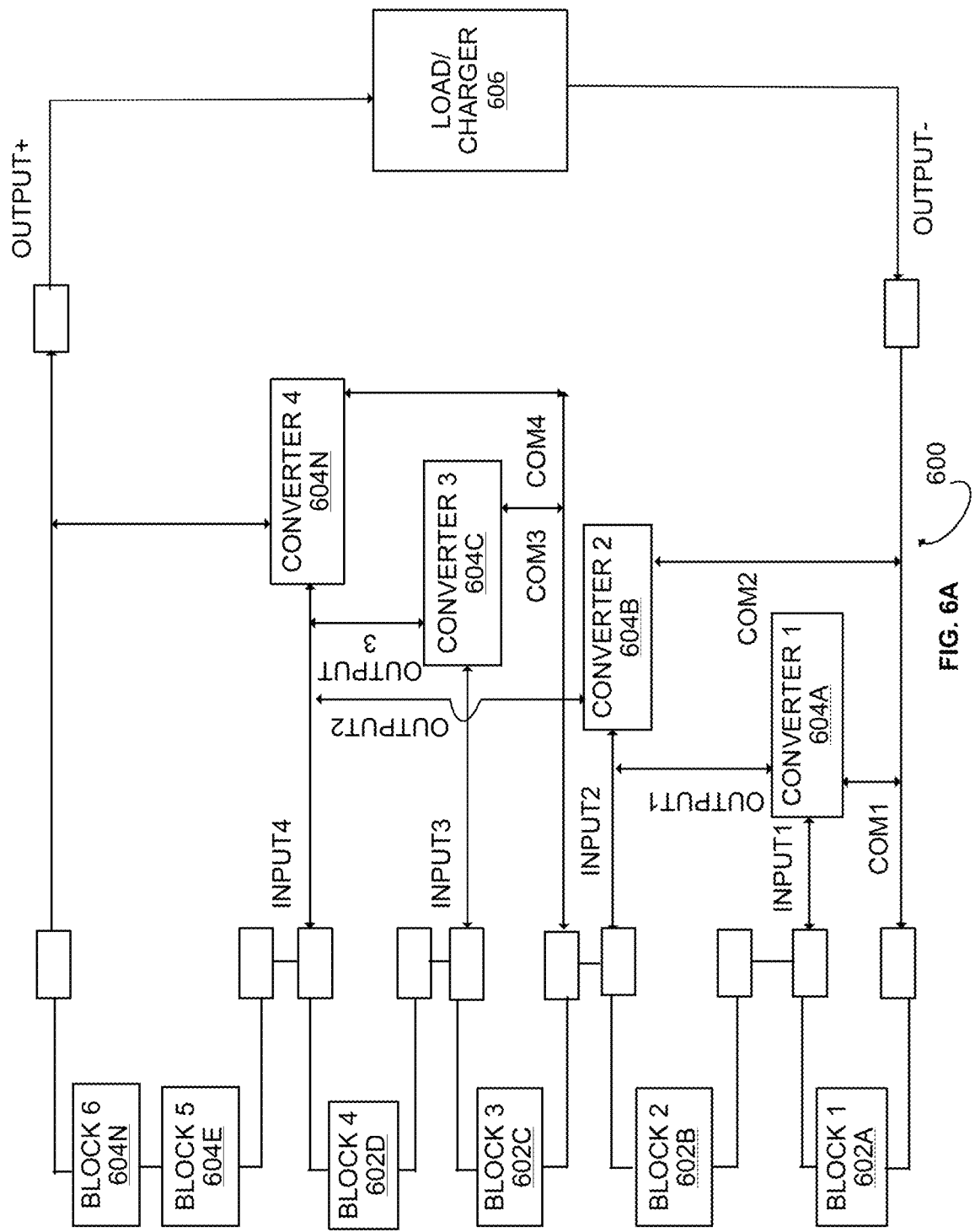
FIGS. 6A-6B illustrate a schematic representation of an interleaved DC-DC converter scheme in the battery management system according to some embodiments herein.

FIG. 6A illustrates a schematic representation 600 of an interleaved DC-DC converter scheme in the battery management system 100 according to some embodiments herein. The schematic representation 600 of the interleaved DC-DC converter scheme includes one or more converters 604A-N connected to one or more blocks 602A-N to form a feed forward circuit with a load circuit 606. The first converter 604A from among the one or more converters 604A-N is operatively connected across a weak block to compensate for current in a corresponding one or more blocks in series configuration of the block and to remove a power mismatch. In some embodiments, an overall current of the one or more blocks in series configuration of blocks in the battery pack 202 is equal to the current of strong blocks. In some embodiments, the DC link is a power bus connected with one or more converters. In some embodiments, using the feed forward circuit, power equalization is done by rerouting excess current from one or more strong blocks into the one or more converters 604A-N connected across the one or more strong blocks and sent to the load circuit 606 (e.g. load unit 104), thereby maintaining an overall current of the string equal to the current of the one or more weak blocks.

Figure 6B:
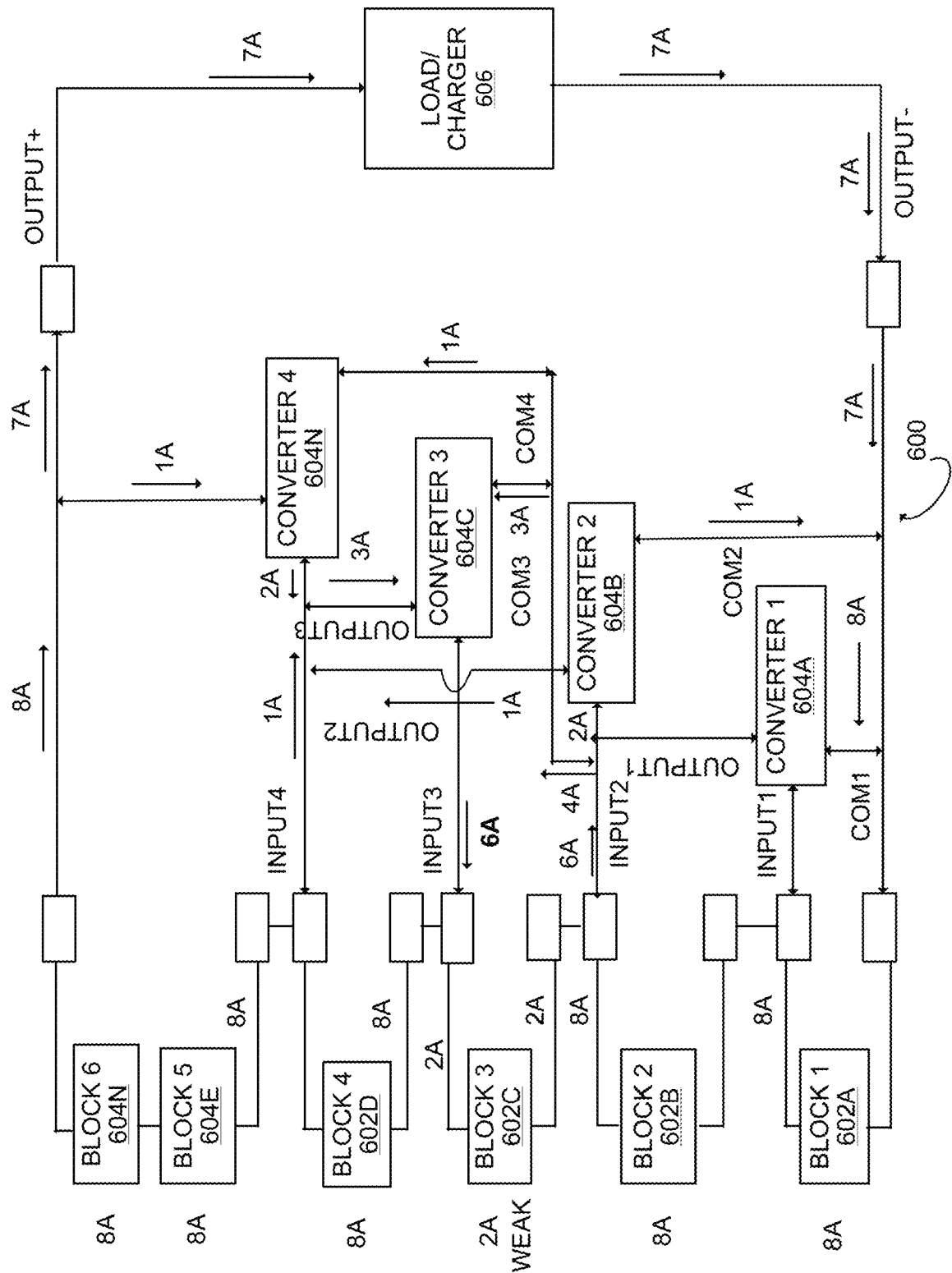

FIG. 6B illustrates how the interleaved DC-DC converter scheme works in the presence of a weak block (Block3 602C). The weak block is only capable of supporting a current of 2 A while all the other blocks are capable of supporting full current of 8 A. FIG. 6B illustrates how each converter operation is controlled to ensure the creation of a bypass path around the weak block3 and the respective current flows in the bypass paths of each converter are shown in the figure. In this case the currents flow through the converters as shown in the figure to ensure overall power requirements are met while ensuring each block is treated per requirements imposed by loads as well as block conditions. The duty cycles for the operation each converter are computed from the SOC measurements of each block to ensure its capability and then set to create the bypass paths for the respective currents. As can be seen from the figure that the load current value is the average of all the block currents (7 A) and therefore all the available capacity of the series connection of blocks is completely utilized. Since only the differential current is rerouted through the converters this design operates at maximum efficiency.

FIG. 7 illustrates a circuit 700 schematic representation of an interleaved DC-DC converter scheme in the battery management system 100 according to some embodiments herein. The circuit 700 of the interleaved DC-DC converter scheme includes a metal-oxide-semiconductor field-effect transistor (MOSFET) 702 A-H. The MOSFET is used with synchronized rectification at high frequency operations. In some embodiments, the MOSFET is used for switching methods to reduce energy loss. The circuit 700 design of the interleaved DC-DC converter scheme is configured in a nested manner. In some embodiments, the nested configuration is used to reduce the number of power supplies. Hence, the nested configuration of the interleaved DC-DC converter scheme provides better control of charge transfer between several stages in the hierarchy of the battery pack 202. In some embodiments, the transfer of charge is not limited to neighboring cells but maybe across multiple blocks of the battery pack 202. In some embodiments, the one or more converters in the interleaved DC-DC converter scheme manages power mismatch by measuring a magnitude of time varying currents as a complex function of mismatched current and the currents are controlled by choosing an appropriate duty cycle of one or more switches. In some embodiments, one or more switches includes a shunt switch.

Figure 8:
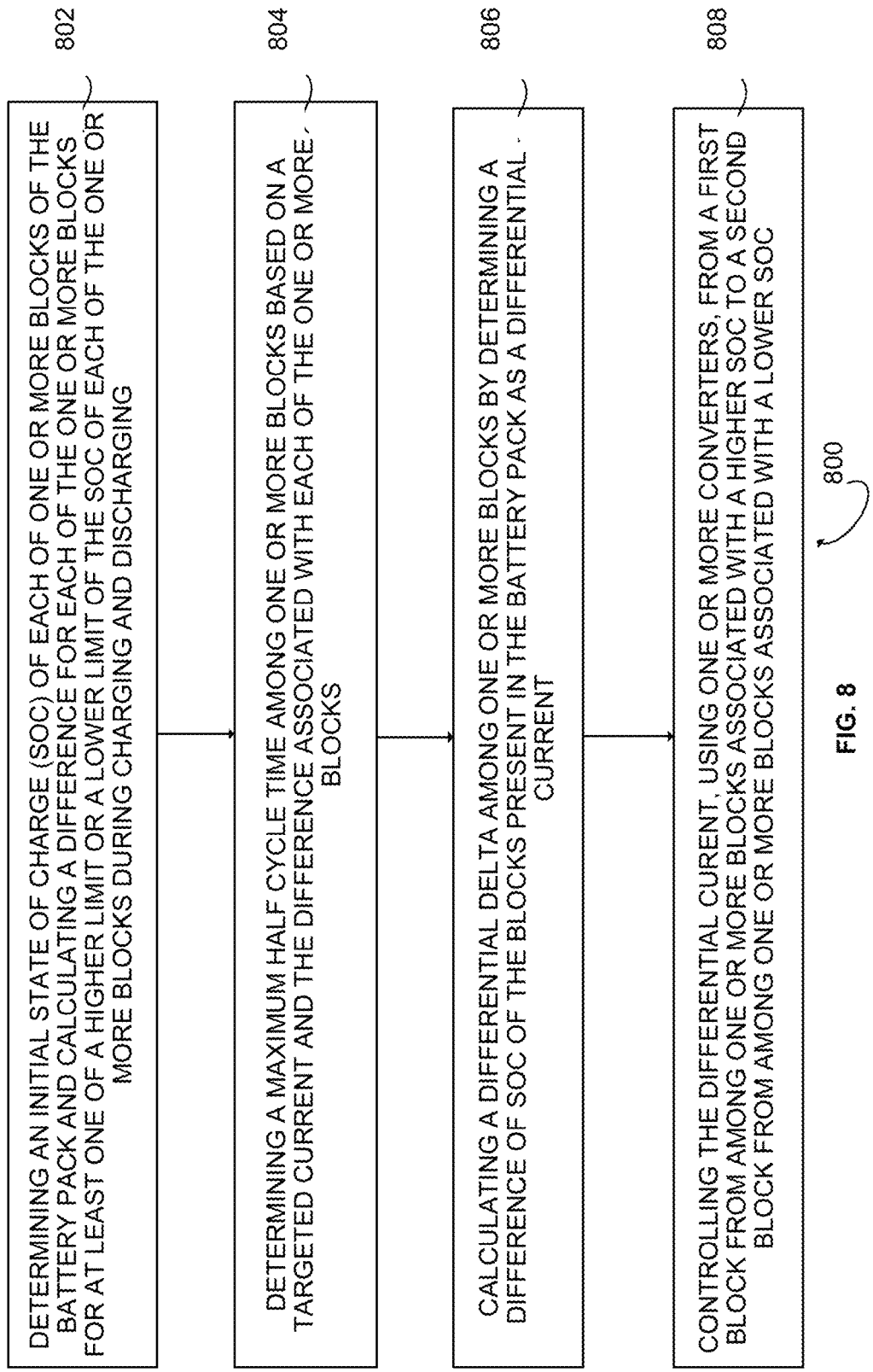
FIG. 8 is a flow diagram that illustrates a method for dynamically balancing power in a battery pack during charging and discharging maximizing available energy, according to some embodiments herein.

FIG. 8 is a flow diagram that illustrates a method 800 for dynamically balancing power in a battery pack 202 during charging and discharging, maximizing available energy, according to some embodiments herein. At step 802, the method 800 includes the step of determining an initial State Of Charge (SOC) of each of one or more blocks of the battery pack 108. At step 804, the method 800 includes the step of calculating a difference (delta) for each of one or more blocks for at least one of a higher limit or a lower limit of the SOC of each of one or more blocks during charging or discharging. At step 806, the method 800 includes the step of determining a maximum half cycle time among one or more blocks based on a targeted current and the differential currents associated with each of the one or more blocks. At step 808, the method 800 includes the steps of calculating a differential delta among one or more blocks by determining a difference of SOC of the blocks present in the battery pack 202 as the differential current.

Figure 9:
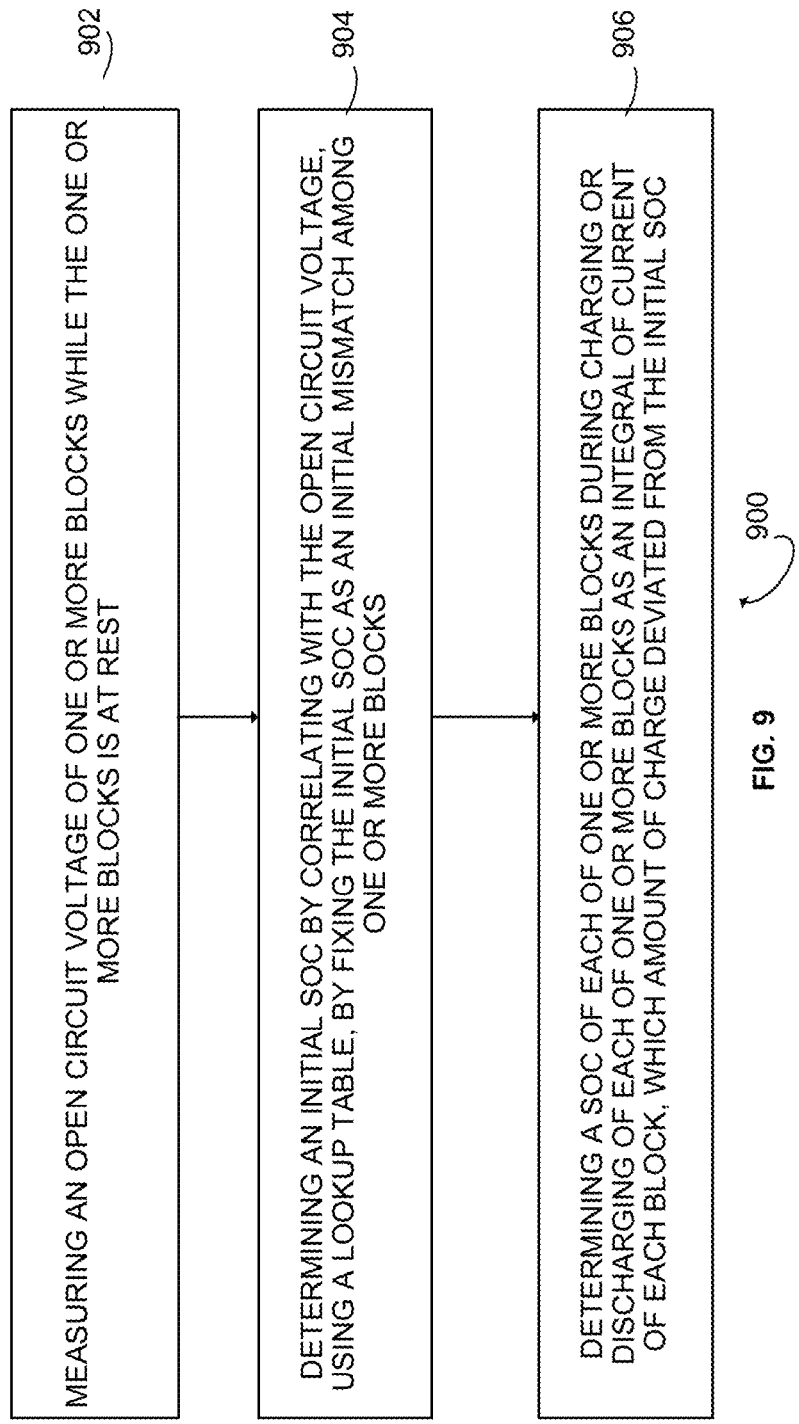
FIG. 9 is a flow diagram that illustrates a method for estimating State of Charge (SOC) of each cell in the battery pack according to some embodiments herein.

FIG. 9 is a flow diagram that illustrates a method 900 for estimating State of Charge (SOC) of each cell in the battery pack 108 according to some embodiments herein. At step 902, the method 900 includes the steps of measuring an open circuit voltage of one or more blocks while one or more blocks is at rest. At step 904, the method 900 includes the steps of determining an initial SOC by correlating with the open circuit voltage, using a lookup table stored in a controller or controller microprocessor non volatile memory element. At step 906, the method 900 includes the steps of determining a SOC of each of the one or more of the blocks during charging and/or discharging as an integral of a current of each block, which is an amount of charge moved in or out of the one or more blocks from the initial SOC, using the initial and subsequent SOC to indicate mismatch among the one or more blocks.

Figure 10:
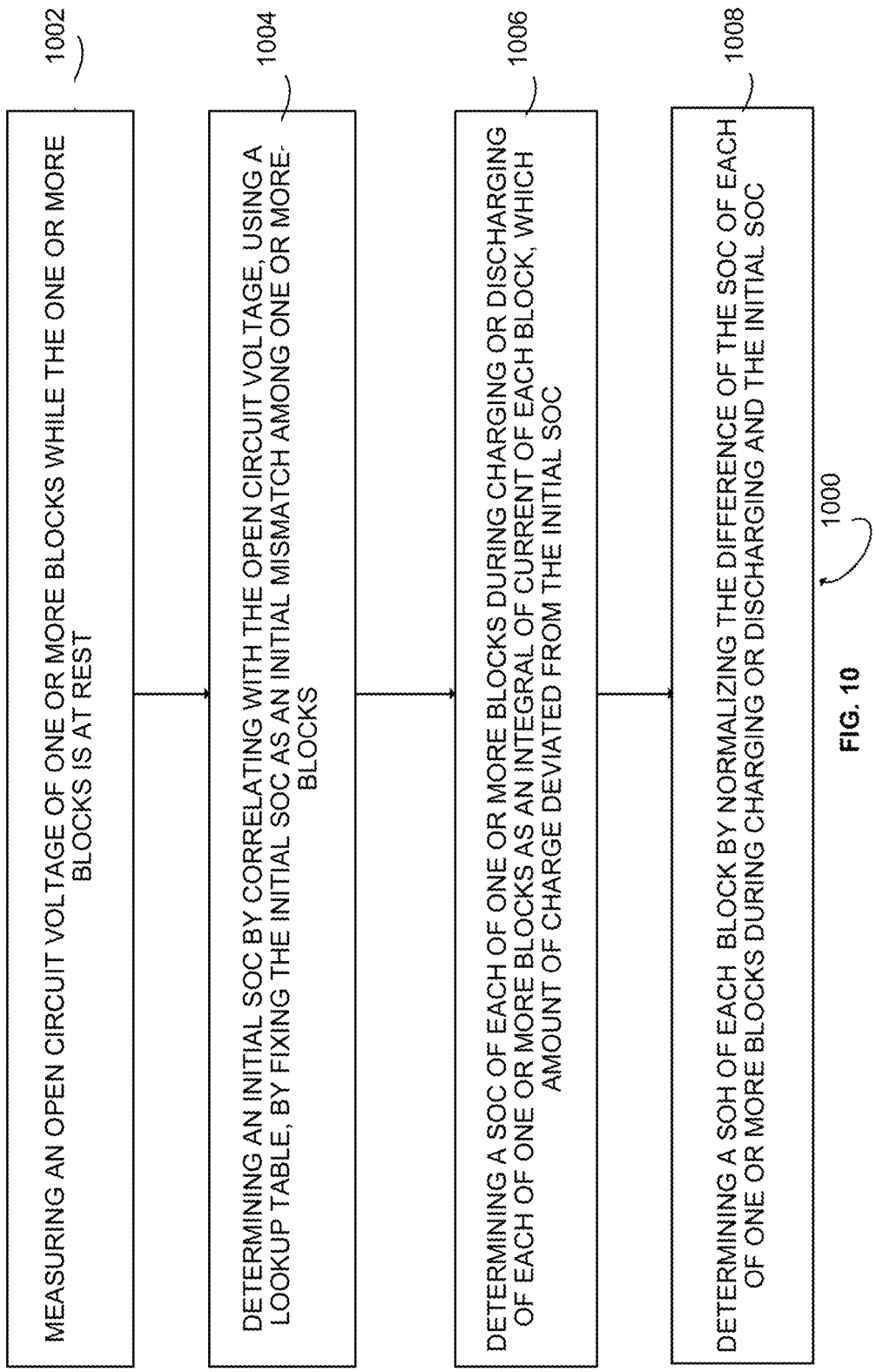
FIG. 10 is a flow diagram that illustrates a method for estimating a State of Health (SOH) of each block in the battery pack according to some embodiments herein.

FIG. 10 is a flow diagram that illustrates a method 1000 for estimating State of Health (SOH) of each block in the battery pack 202 according to some embodiments herein. At step 1002, the method 1000 includes the steps of measuring an open circuit voltage of the one or more blocks while the one or more blocks is at rest. At step 1004, the method 1000 includes the steps of determining an initial SOC by correlating with the open circuit voltage, using a lookup table. At step 1006, the method 1000 includes the steps of determining SOC of each of the one or more the blocks during charging and/or discharging of each of the one or more the block as an integral of current of each block, which is an amount of charge deviated from the initial SOC, by fixing the initial SOC as an initial mismatch among the one or more blocks. At step 1008, the method 1000 includes the steps of determining the SOH of each block by normalizing the capacity of each block during charging and/or discharging to ensure that when the cycle ends and the plurality of blocks have controlled or no remaining mismatch.

The battery management system 100 impacts charging or properly discharging of voltage, current of one or more cells using dynamic balancing, and maximizing the utilization of the available energy of the battery pack 108. The dynamic balancing during charging of the battery pack results in a considerable reduction of wasted cycles for balancing the cells. The active cycles of the battery pack 108 required for balancing the cells are also reduced. The battery management system 100 uses bidirectional balancing current. In some examples, this means 20 times more powerful balancing and a reduction of 90% in energy waste, since the energy is redistributed in the battery pack. The dynamic balancing of the battery management system may allow the use of lower-cost mismatched cells thereby reducing the manufacturing cost of the battery pack and maximizing the energy capacity of the battery pack. The present capacity of positively charged cells or weakly charged cells are utilized through dynamic balancing by implementing a control method as shown in FIG. 8. The battery management system appropriately includes temperature measurement and control while charging or discharging of cells. The cells in the battery pack are sufficiently protected with a state of charge (SOC). The specific temperature of each cell in the battery pack may be amply provided with a temperature sensor. By uncritically accepting mismatched cells at manufacturing, the desired yield of the cell manufacturing plant for specific applications in the electric vehicle/device may be improved tremendously. The individual cell charging profile may be closely maintained. The battery pack charging time may be faster. In some examples, the battery management system 100 is able to perform individual cell diagnostics.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

The invention claimed is:

1. A battery management system for dynamically balancing power in a battery pack, the battery management system comprising:
   a plurality of modules, wherein each of the plurality of modules comprises a plurality of bricks, wherein each of the plurality of bricks comprises a plurality of blocks that are electrically connected in at least one of (i) a series configuration or (ii) a parallel configuration, wherein each of the plurality of blocks comprises a plurality of cells that are electrically connected in at least one of (i) a series configuration or (ii) a parallel configuration; and
   a control unit operatively connected across each of the plurality of blocks for processing power independently from each of the plurality of blocks irrespective of a power mismatch between the plurality of blocks, wherein the control unit comprises a plurality of converters connected together in one of a series configuration or a parallel configuration, and wherein the control unit is configured to dynamically balance the power in the battery pack by controlling a differential current, using the plurality of converters, for flowing the differential current from a first block from among the plurality of blocks associated with a higher State Of Charge (SOC) to a second block from among the plurality of blocks associated with a lower SOC,
   wherein the battery management system is configured to:
      a) determine an initial SOC of each of the plurality of blocks of the battery pack;
      b) calculate a difference for each of the plurality of blocks for at least one of a higher limit or a lower limit of the SOC of each of the plurality of blocks during charging or discharging;
      c) determine a maximum half cycle time among the plurality of blocks based on a targeted current and a plurality of differential currents associated with each of the plurality of blocks; and
      d) calculate the plurality of differential currents among the plurality of blocks by determining a difference of SOC of the blocks present in the battery pack and time available to balance the plurality of differential currents.

2. The battery management system of claim 1, wherein the control unit comprises:
   the plurality of converters operatively connected together in a series configuration across a load circuit, wherein each of the plurality of converters is operatively connected to one of the plurality of blocks, wherein the plurality of converters comprises a plurality of buck boost converters.

3. The battery management system of claim 1, wherein the control unit comprises:
   the plurality of converters operatively connected together in a parallel configuration across a load circuit, wherein each of the plurality of converters is operatively connected to one of the plurality of blocks, wherein the plurality of converters comprises a plurality of buck boost converters.

4. The battery management system of claim 1, wherein the plurality of converters manages a power mismatch by measuring a magnitude of time varying currents as a complex function of mismatched current and the currents are controlled by choosing an appropriate duty cycle of a plurality of switches, wherein the plurality of converters comprises a series of nested bidirectional buck-boost converters with the plurality of switches, wherein the plurality of switches comprises a shunt switch.

5. The battery management system of claim 1, wherein the battery management system goes to a hibernate mode for conserving energy.

6. The battery management system of claim 1, wherein the battery management system is configured to estimate SOC using measured current, cumulative charge delivered in a cycle and voltage for regulating the power mismatch among the plurality of blocks by:
   a) measuring an open circuit voltage of the plurality of blocks while the plurality of blocks is at rest;
   b) determining the initial SOC by correlating with the open circuit voltage, using a lookup table stored in the controller or controller microprocessor non volatile memory element; c) determining a SOC of each of the plurality of the blocks during charging or discharging as an integral of current of each block, which is an amount of charge moved in or out of the one or more blocks from the initial SOC, using the initial and subsequent SOC to indicate mismatch among the one or more blocks.

7. The battery management system of claim 1, wherein the battery management system is configured to estimate state of health (SOH) using a time integral of measured current and voltage for regulating power mismatch among the plurality of blocks, wherein the measured current is used to estimate remaining capacity of the block and providing its ratio to a nameplate capacity of the plurality of blocks by:
   a) measuring an open circuit voltage of the plurality of blocks while the plurality of blocks is at rest; b) determining the initial SOC by correlating with the open circuit voltage, using a lookup table stored in the controller or controller microprocessor non volatile memory element; c) determining the capacity of each of the plurality of the blocks during charging or discharging as an integral of current of each block, which is an amount of charge delivered from the initial SOC, by the initial SOC as an initial mismatch among the plurality of the blocks; and d) determining SOH of each block by normalizing the capacity of each block to its nameplate capacity, using the initial SOC mismatch and the measured SOH of the plurality of blocks to determine the individual currents during charging or discharging to ensure that when the cycle ends the plurality of blocks have controlled or no remaining mismatch.

8. The battery management system of claim 1, wherein the battery management system is further configured to charge each of the plurality of blocks and control bypass current that dynamically balances current and removes mismatch of SOC of each of the plurality of blocks.

9. The battery management system of claim 1, wherein the control unit comprises:
   the plurality of converters, wherein each of the plurality of converters comes into operation only in an event of a power mismatch and processes only mismatched current between the plurality of blocks, else the plurality of converters are bypassed from the path of power flow.

10. The battery management system of claim 9, wherein a ground of each of the plurality of converters is connected between the two adjacent blocks from among the plurality of blocks.

11. The battery management system of claim 9, wherein a first converter from among the plurality of converters is operatively connected across a weak block so as to compensate for a current in a corresponding plurality of blocks in series configuration and to remove a power mismatch, wherein the current at an input of the first converter is obtained from a DC link, wherein the DC link is a power bus connected with the plurality of converters, wherein each of the plurality of converters is an isolated buck boost converter.

12. The battery management system of claim 9, wherein each of the plurality of converters is an isolated buck boost converter, wherein each of the plurality of converters is operatively connected between two adjacent blocks from among the plurality of blocks and output of each of the plurality of converters is connected in a parallel configuration across a load circuit.

13. The battery management system of claim 12, wherein the plurality of converters are connected to form a feed-forward circuit, and wherein, in the feed-forward circuit, power equalization is performed by rerouting excess current from a plurality of strong blocks into the plurality of converters connected across the plurality of strong blocks and sent to the load circuit, thereby maintaining an overall current of a string equal to the current of a plurality of weak blocks.

14. A method for dynamically balancing power in a battery pack by providing an independently determined current for each block during charging and discharging and by maximizing available energy of the battery pack, comprising
a) providing a battery pack that comprises a plurality of modules, wherein each of the plurality of modules comprises a plurality of bricks, wherein each of the plurality of bricks comprises a plurality of blocks that are electrically connected in one of a series configuration or a parallel configuration, wherein each of the plurality of blocks comprises a plurality of cells that are electrically connected in at least one of (i) a series configuration or (ii) a parallel configuration; and
b) processing, using a control unit that is operatively connected across each of the plurality of blocks, power independently from each of the plurality of blocks irrespective of a power mismatch between the plurality of blocks, wherein the control unit comprises a plurality of converters connected together in one of a series configuration or a parallel configuration, wherein the control unit dynamically balances the power in the battery pack by controlling a differential current, using the plurality of converters, for flowing the differential current from a first block from among the plurality of blocks associated with a higher State Of Charge (SOC) to a second block from among the plurality of blocks associated with a lower SOC, thereby maximizing energy of the battery pack during charging and discharging, wherein the power in the battery pack is dynamically balanced by independent currents for each block:
c) determining an initial SOC of each of the plurality of blocks of the battery pack; (d) calculating a difference for each of the plurality of blocks for at least one of a higher limit or a lower limit of the SOC of each of the plurality of blocks during charging or discharging;
e) determining a maximum half cycle time among the plurality of blocks based on a targeted current and a plurality of differential currents associated with each of the plurality of blocks; and
f) calculating the plurality of differential currents among the plurality of blocks by determining a difference of SOC of the blocks present in the battery pack and time available to balance the plurality of differential currents.

15. The method of claim 14, wherein the method comprises, during charging of each of the plurality of blocks, controlling an applied level of voltage independently in each of the plurality of blocks of the battery pack changing the charging paradigm from constant current to constant voltage regime for each block as required.

16. The method of claim 14, wherein the method comprises, during charging each of the plurality of blocks, controlling bypass current that dynamically balances current and removes mismatching of SOC of each of the plurality of blocks.

17. A method for dynamically balancing power in a battery pack by providing an independently determined current for each block during charging and discharging and by maximizing available energy of the battery pack, comprising
a) providing a battery pack that comprises a plurality of modules, wherein each of the plurality of modules comprises a plurality of bricks, wherein each of the plurality of bricks comprises a plurality of blocks that are electrically connected in one of a series configuration or a parallel configuration, wherein each of the plurality of blocks comprises a plurality of cells that are electrically connected in at least one of (i) a series configuration or (ii) a parallel configuration; and
b) processing, using a control unit that is operatively connected across each of the plurality of blocks, power independently from each of the plurality of blocks irrespective of a power mismatch between the plurality of blocks, wherein the control unit comprises a plurality of converters connected together in one of a series configuration or a parallel configuration, wherein the control unit dynamically balances the power in the battery pack by controlling a differential current, using the plurality of converters, for flowing the differential current from a first block from among the plurality of blocks associated with a higher State Of Charge (SOC) to a second block from among the plurality of blocks associated with a lower SOC, thereby maximizing energy of the battery pack during charging and discharging, wherein the power in the battery pack is dynamically balanced by independent currents for each block:
c) determining an initial SOC of each of the plurality of blocks of the battery pack; (d) calculating a difference for each of the plurality of blocks for at least one of a higher limit or a lower limit of the SOC of each of the plurality of blocks during charging or discharging;
e) determining a maximum half cycle time among the plurality of blocks based on a targeted current and a plurality of differential currents associated with each of the plurality of blocks; and
f) calculating the plurality of differential currents among the plurality of blocks by determining a difference of SOC of the blocks present in the battery pack and time available to balance the plurality of differential currents; and during charging each of the plurality of blocks, controlling bypass current that dynamically balances current and removes mismatching of SOC of each of the plurality of blocks.

\* \* \* \* \*